United States Patent [19]
Battin et al.

[11] Patent Number: 5,649,299
[45] Date of Patent: Jul. 15, 1997

[54] APPARATUS AND METHOD FOR ADAPTING A DIGITAL RADIOTELEPHONE SYSTEM TO INCREASED SUBSCRIBER TRAFFIC

[75] Inventors: John W. Battin, North Barrington, Ill.; Charles N. Lynk, Jr., Bedford; Kevin M. Laird, Haltom City, both of Tex.

[73] Assignee: Motorola, Inc., Schaumburg, Ill.

[21] Appl. No.: 144,166

[22] Filed: Oct. 27, 1993

[51] Int. Cl.$^6$ .................................................. H04Q 7/32
[52] U.S. Cl. ........................... 455/62; 455/343; 375/222; 370/311
[58] Field of Search .......................... 455/33.1, 34.1, 455/34.2, 38.3, 54.1, 72, 63, 89; 379/59; 375/8; 370/84, 94.1, 347, 349, 311

[56] References Cited

U.S. PATENT DOCUMENTS

| | | | |
|---|---|---|---|
| 4,435,840 | 3/1984 | Kojima et al. | 455/33 |
| 5,038,399 | 8/1991 | Bruckert | 455/54 |
| 5,095,539 | 3/1992 | Leveque | 455/72 |
| 5,115,429 | 5/1992 | Hluchyj et al. | 370/94.1 |
| 5,128,959 | 7/1992 | Bruckert | 455/33.2 |
| 5,164,652 | 11/1992 | Johnson et al. | 455/89 |
| 5,185,566 | 2/1993 | Goedken et al. | 320/48 |
| 5,203,012 | 4/1993 | Patsiokas et al. | 455/34.1 |
| 5,235,614 | 8/1993 | Bruckert et al. | |
| 5,241,565 | 8/1993 | Kloc et al. | 455/72 |
| 5,305,468 | 4/1994 | Bruekert et al. | 455/38.3 |
| 5,414,796 | 5/1995 | Jacobs et al. | 395/2.3 |

*Primary Examiner*—Edward F. Urban
*Attorney, Agent, or Firm*—Raymond J. Warren

[57] ABSTRACT

A digital radiotelephone system employs vocoders to convert between analog speech and a digital format suitable for transmission via radio. Under most circumstances, the highest data rate is selected for optimum audio quality. When the system occupancy exceeds a particular threshold, as detected at the fixed site of the system, some or all of the vocoders are instructed to switch to a lower data rate to provide for an increase in the number of communication channels. Further, a portable subscriber unit may autonomously change its vocoder data rate depending upon the charge state of its battery.

3 Claims, 6 Drawing Sheets

APPARATUS AND METHOD FOR ADAPTING A DIGITAL RADIOTELEPHONE SYSTEM TO INCREASED SUBSCRIBER TRAFFIC

FIELD OF THE INVENTION

The technical field of the present invention generally relates to radiotelephone systems and more particularly to digital radiotelephone systems which can adapt to high subscriber traffic loading.

BACKGROUND OF THE INVENTION

In virtually every radiotelephone system, a large number of subscribers are served from a central fixed site which provides communication channels to the subscribers as the channels are needed and as the subscribers move from place to place. Of course in any such system it is likely that the number of subscribers will occasionally exceed the number of communication channels available. This problem has been addressed in many ways, including providing a busy signal to the subscriber (that is, simply not providing service) and constructing cellular systems having the capacity to reduce the sizes of the radio coverage areas (cells) and to subsequently place more cells and hence more communications channels in a geographic area. Needless to say, not providing service is an unacceptable solution while the process of cell splitting and redeployment is slow and not responsive to a dynamic radiotelephone system.

Digital radiotelephone service has been proposed as another method of increasing the number of channels available to subscribers. Two of the most promising digital methods, time division (TD) and code division (CD), offer increased channel availability by further sharing the physical resources among the subscribers. Simply stated, analog signals (such as voice) are converted (in a vocoder) to a digital signal using a conversion format having specified sampling frequency and a particular data compression technique. The compressed data is combined with the time division or code division signal and transmitted, via radio, to the receiver. The receiver demodulates the time division or code division transmitted signal and decompresses and resamples the data in a process complementary to the conversion prior to transmission. This produces a reproduced analog signal at the receiver.

The radiotelephone service is bi-directional in that the fixed station both transmits and receives vocoded signals and the subscriber unit reciprocally transmits and receives vocoded signals. Compatibility between transmitting units and receiving units requires that the conversion rates and compression techniques be opposite and equal. Whatever rate is used in the analog to digital processing must be matched in the corresponding digital to analog processing. It should be noted that, in general, the lower the vocoder bit rate, the greater the number of available communications channels, but the quality of the speech is reduced.

It has been suggested that the vocoding rates be made variable to encode speech signals at rates based upon the characteristics of the speech to be encoded. In order that the optimum quality of speech be transmitted, the highest rate is used during passages of speech. When the speaker pauses or stops speaking, a variable rate vocoder reduces the rate, thus lowering the average rate per talker, which allows the system to provide more communications channels. See, for example, U.S. Pat. No. 5,515,375 "Method and Apparatus for Multiplexing Fixed Length Message Data and Variably Coded Speech" filed on behalf of DeClerck on Jul. 30, 1993 and assigned to the assignee of the present invention.

Even employing the foregoing techniques may not yield a radiotelephone system offering a sufficient number of communication channels in an efficient manner to accommodate a large subscriber population.

DETAILED DESCRIPTION OF A PREFERRED EMBODIMENT

The use of digital technologies to increase system capacity has offered the system designer the opportunity to digitally compress the message data. As the data rate is reduced, however, the quality of the audio message is compromised. The promise of better audio quality is realized only when the higher data rates are used, so it is desirable to preferentially use these higher rates. At certain times, busy hour for example, and in certain locations, some congested metropolitan areas for example, the subscriber radiotelephone traffic exceeds the number of communication channels available. Since reduced data rates occupy less of the radio spectrum, more subscribers can be served when the data rates are reduced. The subscribers' desire for service is balanced against the reduced audio quality of the lowered data rate. Some subscribers may desire a non-changing audio quality and may, at a higher tariff, be designated a priority subscriber.

Figure 1:
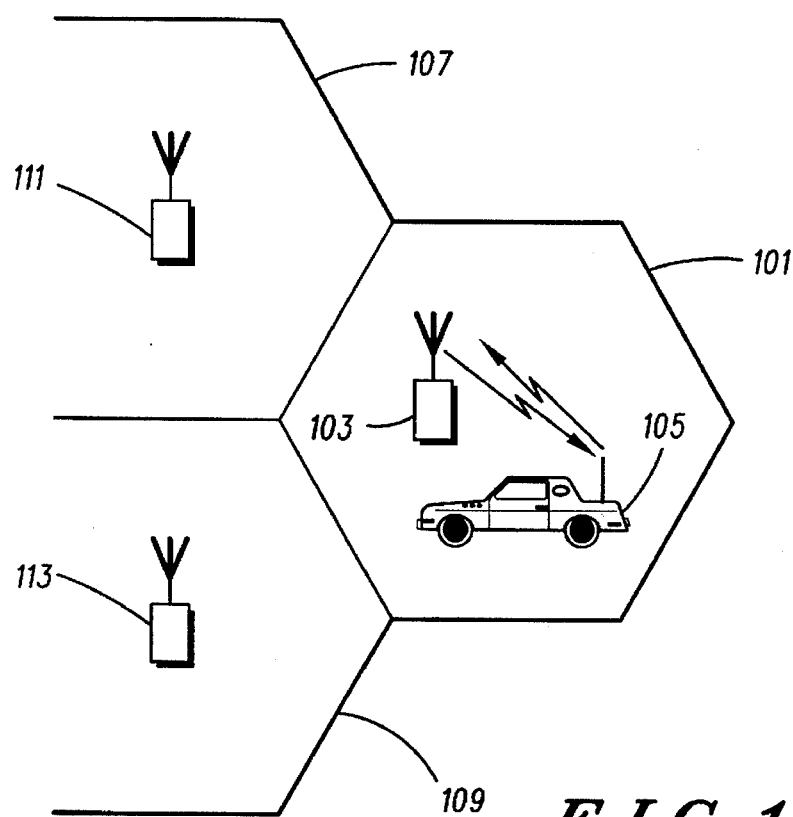
FIG. 1 is a simplified diagram of a radiotelephone system which may employ the present invention.

A radiotelephone system which may employ the present invention is shown in the diagram of FIG. 1. A radiotelephone system having a radio coverage area 101 is depicted as a hexagonal geographic area served by fixed station 103. Fixed station 103 conventionally includes transceivers, controllers, and telephone interface devices which cooperate to provide two way radio communication to a subscriber unit 105. A large number of subscriber units (not shown), both mobile and portable, are served from the fixed site 103 for the geographic radio coverage area 101. Other radio coverage areas, 107 and 109, may be arranged nearby or adjacent to radio coverage area 10 1 and may supply radiotelephone service to subscribers in radio coverage areas 107 and 109 from fixed sites 111 and 113, respectively. A preferred embodiment of the present invention employs a code division multiple access (CDMA) digital modulation technique such as that described in EIA/TIA/IS-95, "Mobile Station-Base Station Compatibility Standard for Dual-Mode Wide Band Spread Spectrum Cellular System".

Figure 2:
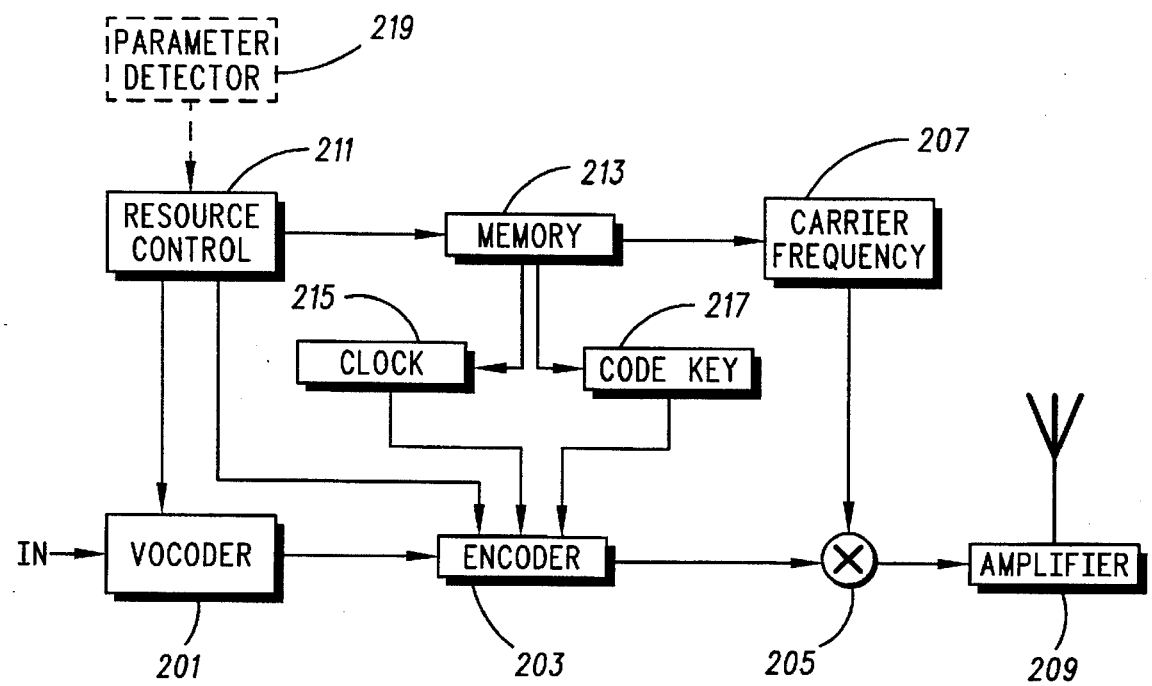
FIG. 2 is a block diagram of a CDMA transmitter which may be employed in the present invention.

FIG. 2 is a block diagram of a CDMA transmitter which may be employed in the present invention. Signals to be transmitted, such as voice, are input to a vocoder 201 for digital conversion and processing before being transmitted. The output signal from the vocoder 201 is input to an encoder 203, coupled to a mixer 205, and mixed with a radio carrier frequency generated by carrier frequency generator 207. A selected output from mixer 205 is applied to amplifier 209 for subsequent transmission. Vocoder 201 and encoder 203 are under the control of resource controller 211. Resource controller 211 may be a general purpose computer having an associated memory 213. A clock 215 provides a clock signal output to the encoder 203 and is dependent upon a clock speed loaded into it from memory 213, as instructed by resource control 211. The code key 217 is a buffer containing a code loaded from memory 213 as instructed by resource control 211. The code key is, conventionally, a pseudorandom number used to generate a repeating sequence of digital numbers to encode the output of vocoder 201. The carrier frequency generator 207 is also programmable to a frequency determined by a value loaded from memory 213. Thus the encoder 203 together with an input from code key 217 provides a pseudorandom number by which a spread spectrum signal may be generated from an input from the vocoder 201 or the resource controller 211. A set of frequencies defining communication resources exists within a frequency table in memory 213. This frequency table may be created upon startup depending upon an allocated frequency spectrum and bandwidth defined for the system in which the transmitter is operating. Since different, non-interfering spread spectrum signals may be transmitted on the same frequency but under different code keys, a number of communication channels are available on the same frequency without mutual interference.

Similar CDMA transmitters are found in both the fixed site equipment and the subscriber equipment. In the preferred embodiment, the subscriber equipment may include a parameter detector 219 which is typically used to detect battery charge conditions and report these conditions to the resource control 211.

Figure 3:
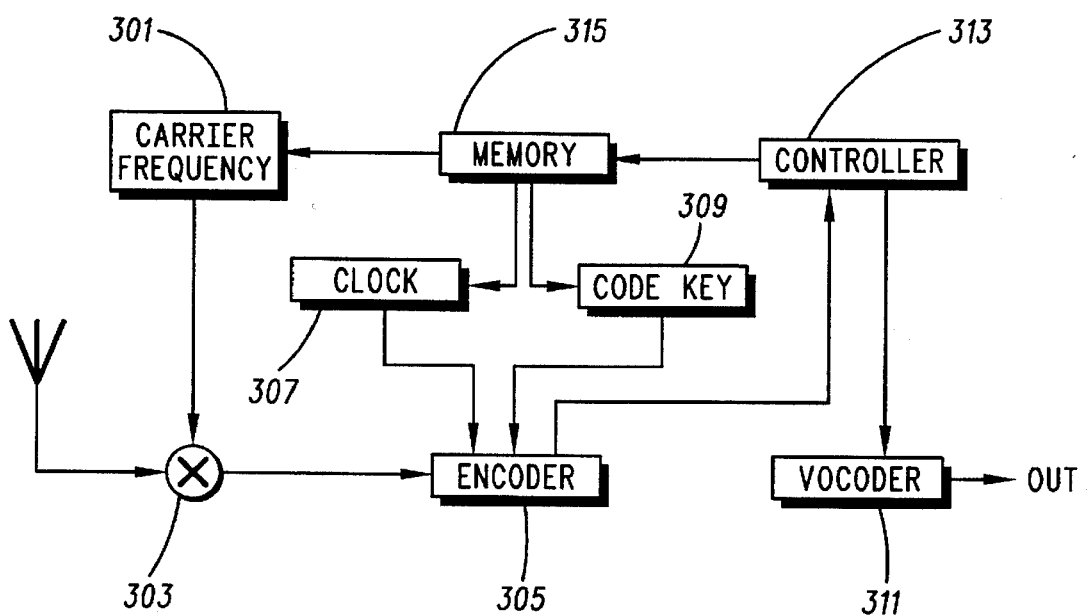
FIG. 3 is a block diagram of a CDMA receiver which may be employed in the present invention.

A code division multiple access (CDMA) receiver, which may be used in the subscriber equipment of the present invention, is shown in block diagram form in FIG. 3. A carrier frequency generator 301 provides a radio frequency signal to mixer 303 so that received RF signals may be converted to a convenient frequency for processing by decoder 305. In a process reversing that of the transmitter of FIG. 2, a pseudorandom number generator of decoder 305, in conjunction with clock 307 and code key buffer 309, extracts the data produced by vocoder 201 and provides this data to vocoder 311. Synchronization to the encoding pseudorandom number and specific carrier frequency are accomplished in conventional fashion by controller 313 and its associated memory 315.

Figure 4:
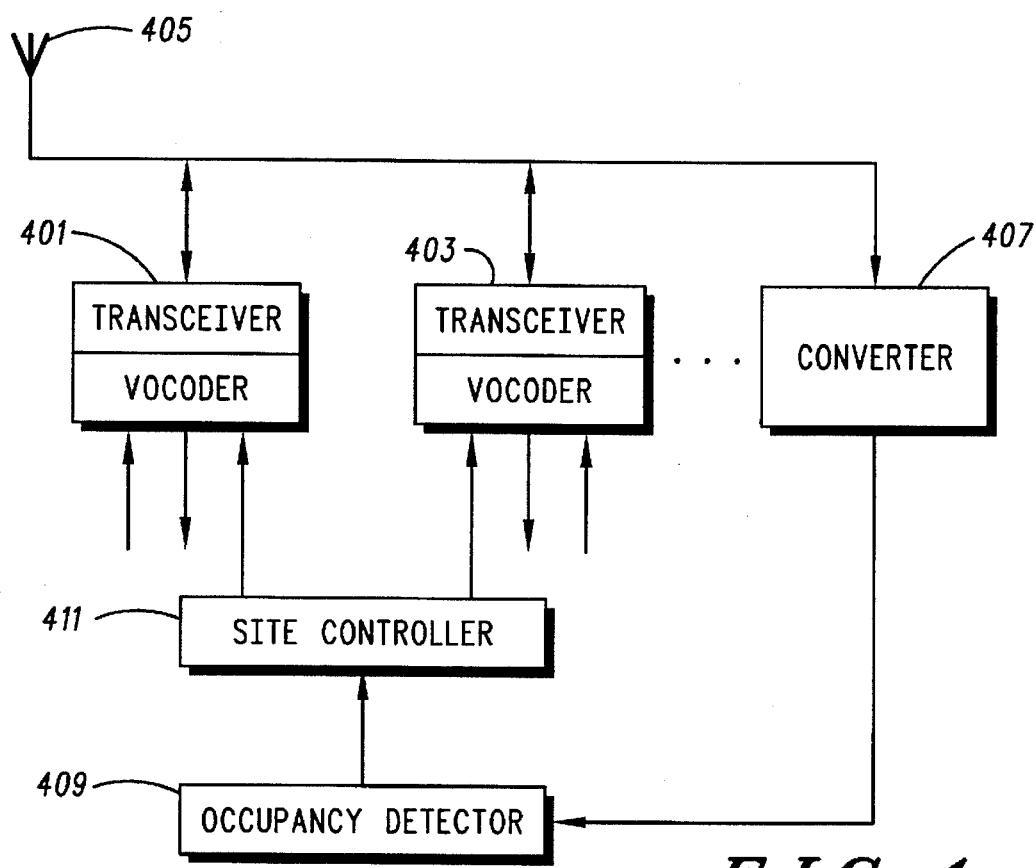
FIG. 4 is a block diagram of a fixed site illustrating an equipment configuration which may be employed in the present invention.

Similar receivers may be found at the fixed site 103 and a simplified block diagram of the arrangement of equipment at the fixed site is shown in FIG. 4. Transceivers and vocoders are shown as blocks 401 and 403. These transceivers, along with others, are coupled to an antenna system 405 for transmission and reception of signals to and from the radio coverage area. Also coupled to antenna system 405 is a signal converter 407 which filters and couples the entire bandwidth of radio frequency utilized by all of the transceivers operating at the fixed site. Output of the converter 407 is coupled to a spectrum occupancy detector 409 for determination of the number of subscriber units currently in service and transmitting signals to the fixed site. In the preferred embodiment, the spectrum occupancy detector 409 is an energy amplitude detector providing an output signal which is proportional to the combined received signals in the occupied bandwidth of the fixed site. This signal is output to site controller 411 which, among its other duties, compares the signal output from occupancy detector 409 to a threshold value corresponding to a known number of subscriber units representing a system operator-established percentage of full channel capacity of the fixed site. Once this threshold is crossed, the site controller 411 provides one or more output signals to the vocoders of transceivers 401 and/or the vocoder of the transceiver 403 instructing the selected vocoder to reduce its sampling rate. A corresponding message is transmitted to the controller of the subscriber unit communicating with the selected transceiver instructing the subscriber unit vocoder to reciprocally operate at a rate corresponding to the rate of the vocoder at the fixed site.

Figure 5:
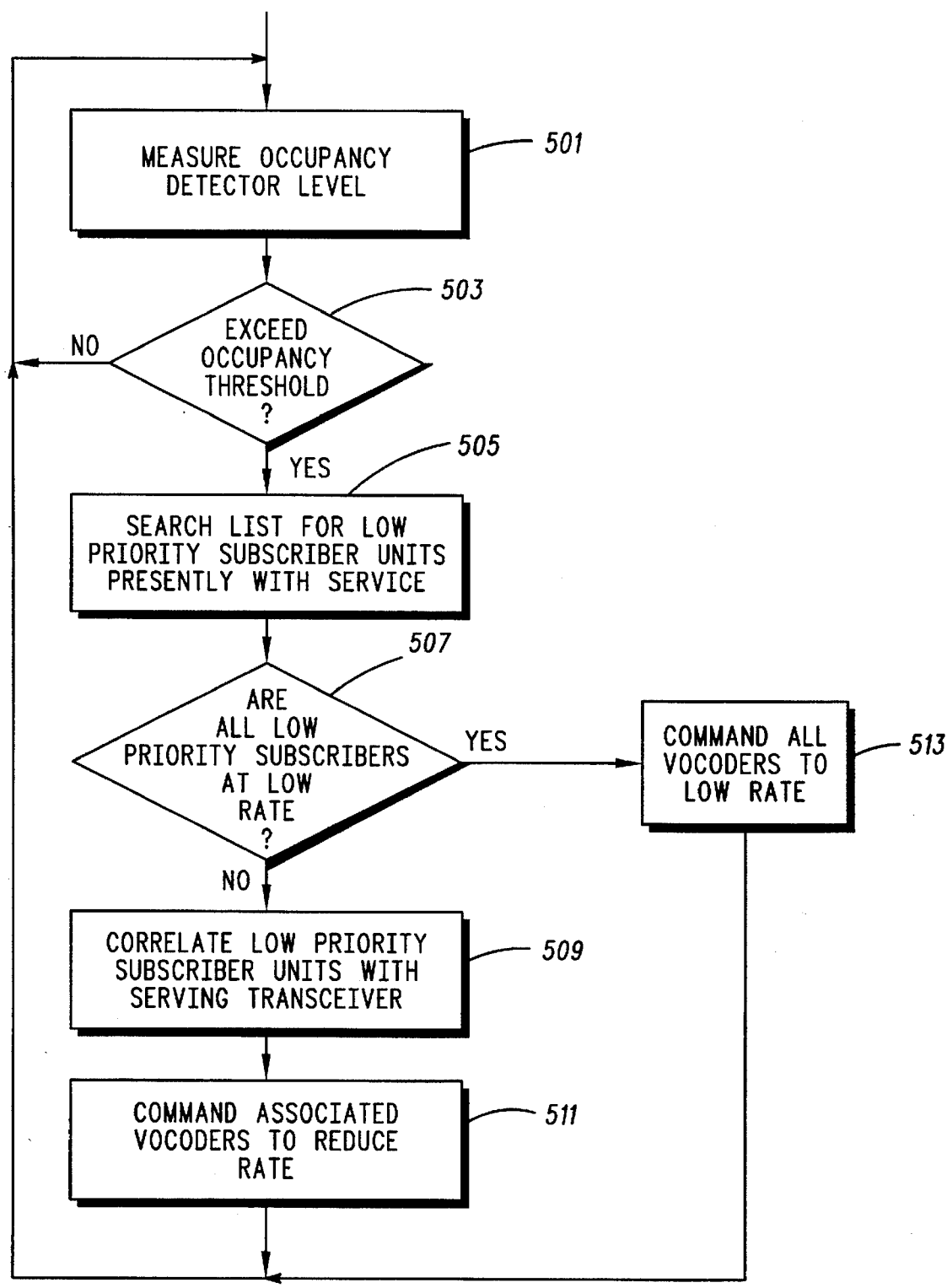
FIG. 5 is a flowchart of the process employed by the site controller of FIG. 4 to control the reduction of vocoder rate.

It is a feature of the present invention that the data rate of the fixed vocoder and its associated subscriber unit vocoder be adjusted in accordance with the number of subscriber units obtaining service from the fixed site in its radio coverage area. This is accomplished in accordance with the process shown in the flow chart of FIG. 5. The site controller 411 measures the occupancy detector 409 output signal level at 501 and determines whether this level exceeds the occupancy threshold set for this fixed site at 503. If the threshold is not exceeded, the site controller 411 returns to its other tasks including a periodic remeasurement of the occupancy detector level. If the threshold is exceeded, a list of low priority subscriber units, maintained at the fixed site, is searched at 505 and those presently obtaining service are identified. A determination is made, at 507, whether all the low priority subscribers currently having service have their fixed site and subscriber unit vocoders set to the low data rate. If there remain low priority subscribers having vocoder rates at the high data rate, the identified low priority subscriber, its serving transceiver, and the associated vocoders are identified at 509. The associated vocoders are then commanded to reduce their data rate at 511. If all of the low priority subscribers currently with service are found to be at the low data rate at 507, then all vocoders operating at this fixed site are commanded to the low data rate at 513.

Figure 6:
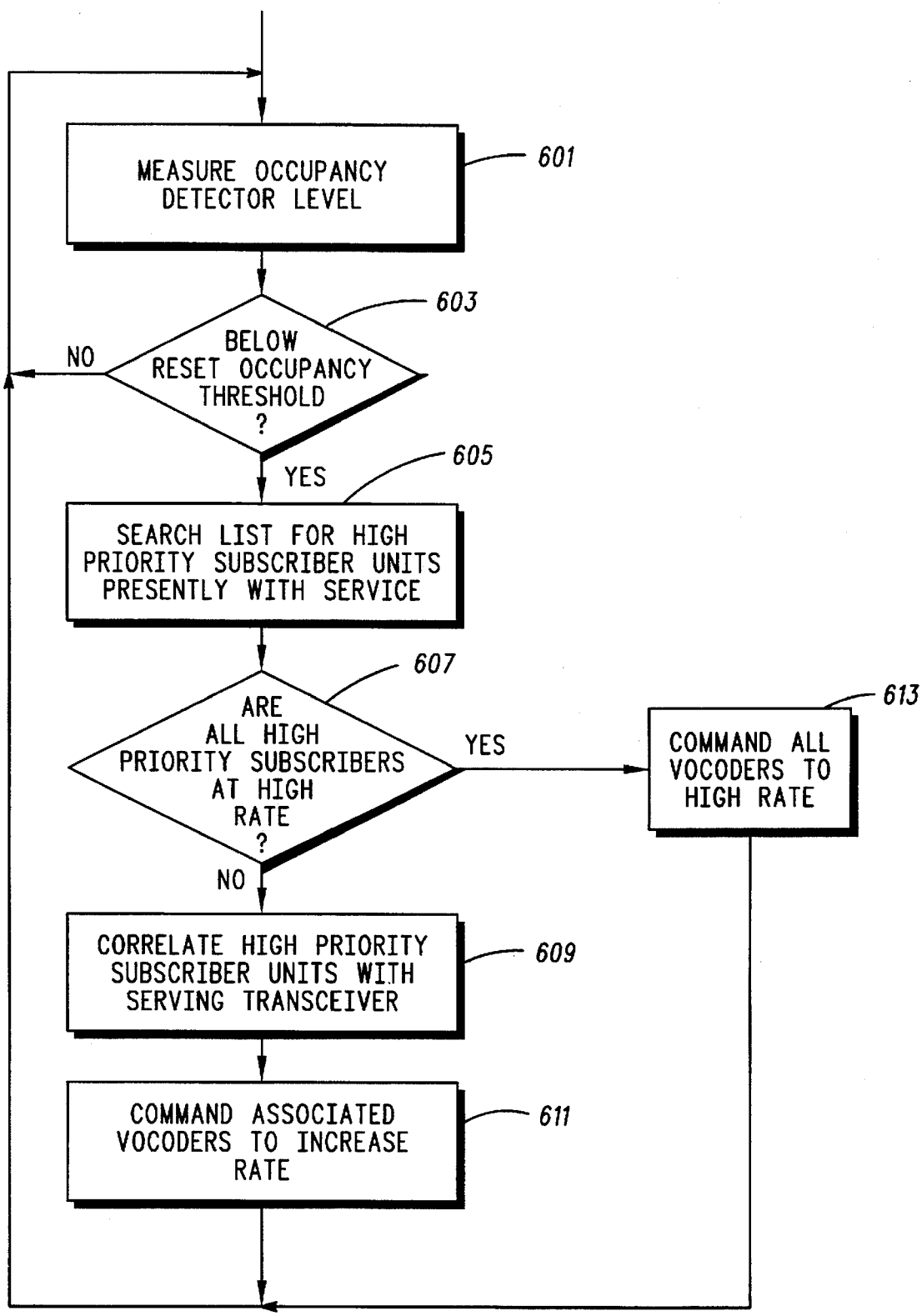
FIG. 6 is a flowchart of the process employed by the site controller of FIG. 4 to control the increase of vocoder rate.

The complementary reset process for returning the system vocoding data rate to its normal high rate is shown in FIG. 6. The site controller 411 accepts the signal from occupancy detector 409 and measures the occupancy detector level at 601. If the detector level is below a reset occupancy threshold (a threshold below that required to switch from the high rate of sampling to provide hysteresis) at 603. A detector level which is not below the reset occupancy threshold causes the site controller process to return to its other tasks. A detector level below the reset occupancy threshold causes the site controller 411 to search the list of high priority subscriber units presently with service at 605. If not all of the high priority subscriber units have been returned to the high data rate as determined at 607, a correlation is made between high priority subscriber units and their serving transceivers at 609. The associated vocoders are then commanded to increase their data rate at 611. If all of the high priority subscribers have been returned to the high data rate as determined at 607, then all vocoders are commanded to the high data rate at 613 and the site controller 411 returns to its normal schedule of activity.

Figure 7:
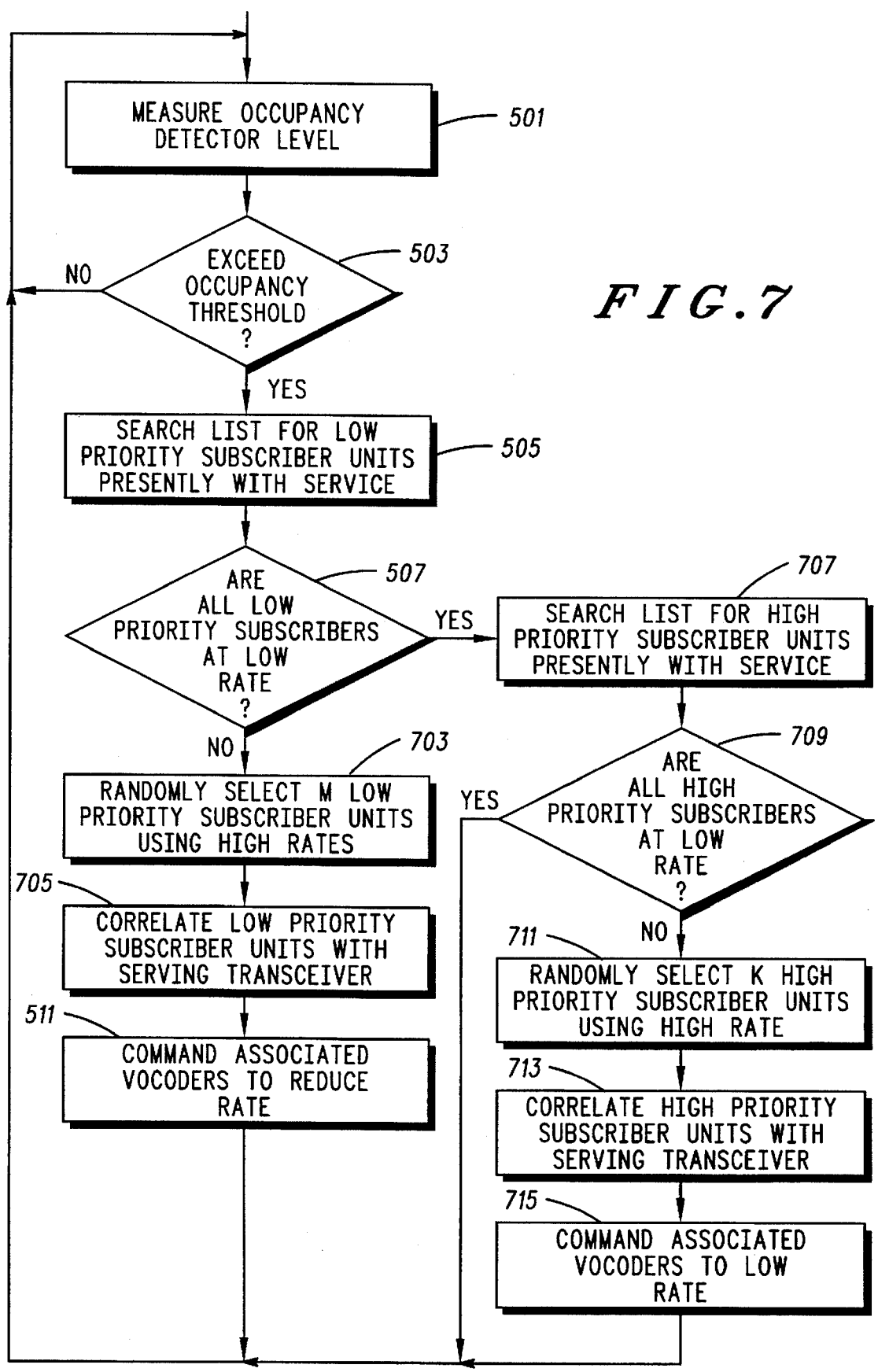
FIG. 7 is a flowchart of an alternative process employed by the site controller of FIG. 4 to control reduction of vocoder rate.

In an alternative embodiment, subscribers may be commanded to the low data rate incrementally. As shown in FIG. 7, when the determination is made that not all low priority subscribers are at the low data rate, at 507, a random selection of a number, M, of subscribers (which could be M=1) is made, at 703. These selected low priority subscribers are correlated with the serving transceivers at 705 and the associated vocoders are commanded to the low data rate, at 509.

If all the low priority subscribers are at the low rate, a search of the subscriber list is made for those high priority subscribers presently receiving service, at 707. A determination is made, at 709, whether all the high priority subscribers are at the low data rate. If not all are, a random selection of a number, K, of high priority high data rate subscribers (which could mean K=1 and/or M≠K) is made at 711. These selected subscribers are correlated with their serving transceivers at 713 and the associated vocoders are commanded to the low data rate at 715.

Figure 8:
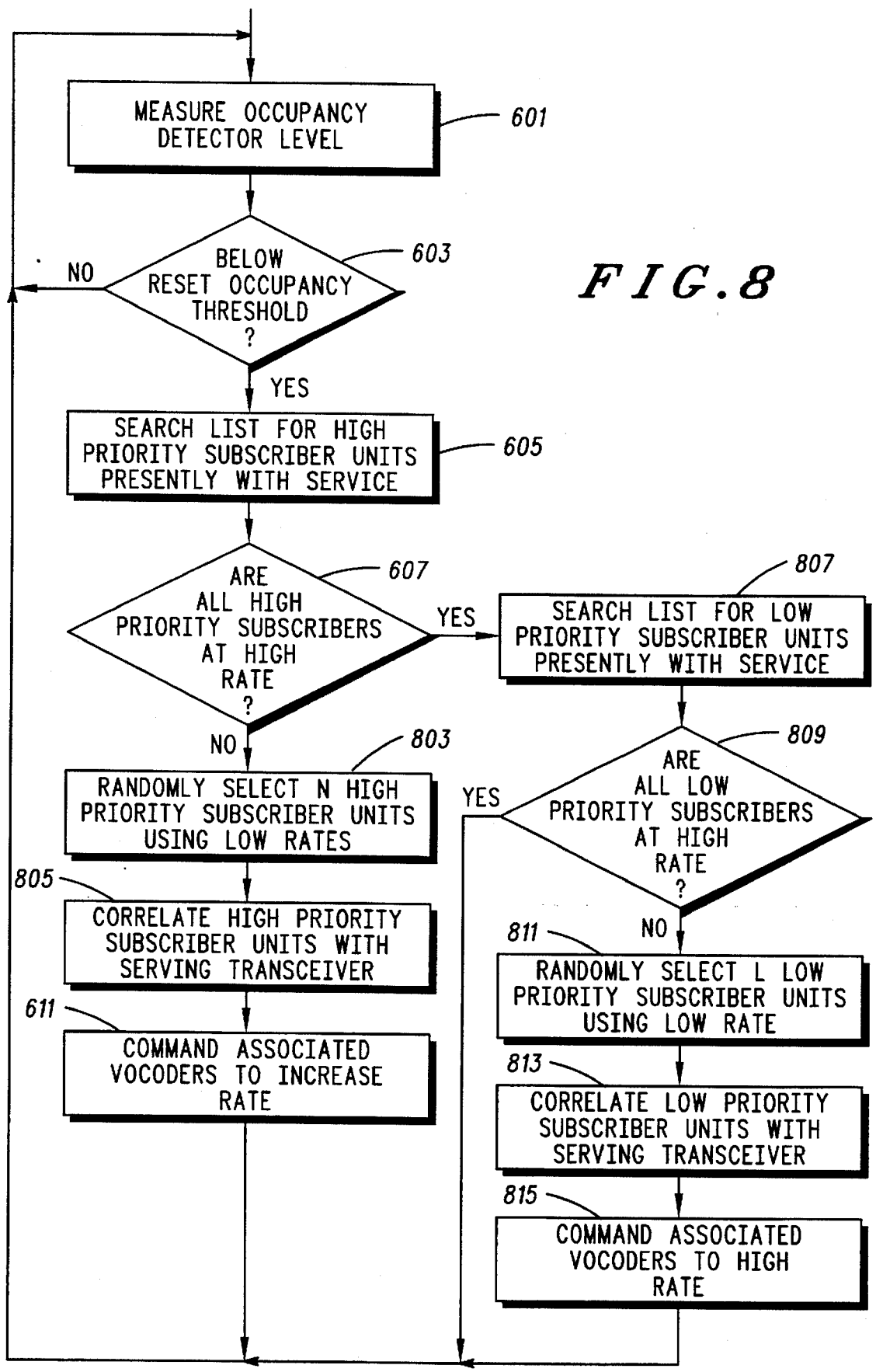
FIG. 8 is a flowchart of an alternative process employed by the site controller of FIG. 4 to control the increase of vocoder rate.

To incrementally return to the high data rate service when the system subscriber loading allows, the alternative embodiment process of FIG. 8 is followed. If the determination is made, at 607, that not all of the high priority subscribers have been returned to the high rate, a random selection of a number, N, of high priority subscribers (where N=1 is a possibility) using the low rate is made at 803. These selected subscribers are correlated with their serving transceivers, at 805, and the associated vocoders are commanded to the high data rate at 611.

If all of the high priority subscribers are at the high data rate, a search is made of the subscriber list for low priority subscribers presently with service from the system, at 807. A determination is made, at 809, whether some low priority subscribers remain at the low data rate and, if so, a random selection of a number, L, of such subscribers is made, at 811. The number of subscribers may be L=1 and it is possible that L≠M. The selected low priority subscribers are correlated with their serving fixed transceiver, at 813, and the associated vocoders are commanded to the high data rate at 815.

In those systems having subscriber priority, additional levels of priority may be assigned such that certain selected subscriber vocoders may not be commanded to a low data rate while other selected subscriber vocoders may not be commanded to a high data rate. For example, subscribers using the radiotelephone system for communications relating to public safety may always require the highest audio quality. On the other hand, some subscribers may only require minimum communications capability and are willing to accept somewhat lower audio quality for a lower subscriber tariff. A system implementing these classes of priority will have an exemption to the vocoder rate change command instructions of FIGS. 5–8.

The subscriber unit, in the preferred embodiment, also has the capability of selecting a vocoder rate depending upon certain operating parameters of the subscriber unit. This feature is especially useful in a portable subscriber unit where battery life is important but other portable parameters may also be used to trigger a change of vocoder rate. Modification of device operating characteristics in accordance with a detected battery type has been shown in U.S. Pat. No. 5,164,652 and detection of battery state of charge has been shown in U.S. Pat. No. 5,185,566, both of which have been assigned to the assignee of the present invention. It is well known that higher vocoder data rates consume more power than lower rates. To prolong battery life, a battery parameter detector dynamically determines the remaining charge in the battery. When a threshold of low charge is crossed, the parameter detector 219 of the subscriber unit supplies a signal to the resource control 211. The resource control 211 prepares and sends a control message to the fixed site corresponding vocoder to reduce the data rate, and the resource control 211 commands vocoder 201 of the subscriber unit to reduce its data rate. The subscriber using the portable subscriber unit is given extended battery life at the expense of a reduced quality of vocoded audio.

Variable rate vocoders, which may be employed in the present invention, have been described in IS-96 generated by the Telecommunication Industry Association (TIA) TR-45.5 committee standards body. The transmitting vocoder takes voice samples and generates an encoded speech packet for transmission to the receiving vocoder. The receiving vocoder decodes the received speech packet into voice samples. The vocoder of the present invention uses a code excited linear predictive (CELP) coding algorithm. This technique uses a random codebook to vector quantize the residual signal during an analysis by synthesis method. The vocoder uses a variable output data rate based upon system channel loading. In operation, a vector is taken from a codebook of random Gaussian vectors (for rate ⅛, a random vector is generated). This vector is multiplied by a gain term and then filtered by the long term pitch filter whose characteristics are governed by the pitch parameters. The output is filtered by the format synthesis filter, also called the linear predictive coding filter, to produce a speech signal. The speech signal is also filtered by the adaptive postfilter. The encoding process samples the input speech at 8 KHz. This sampled speech is broken down into 20 msec. of vocoder frames consisting of 160 samples. The linear predictive coding filter coefficients are updated once per frame regardless of the data rate selected. The number of bits used to encode the linear predictive encoding parameters is a function of the selected data rate. Within each frame, the pitch parameters are updated a varying number of times where the number of pitch parameter updates is also a function of the selected data rate. Similarly, the codebook parameters are updated a varying number of times where the number of updates is a function of the selected data rate.

TABLE I

| Parameter | Rate 1 | Rate ½ | Rate ¼ | Rate ⅛ |
|---|---|---|---|---|
| Linear Predictive Coding (LPC) updates per frame | 1 | 1 | 1 | 1 |
| Samples per LPC update | 160 (20 msec) | 160 (20 msec) | 160 (20 msec) | 160 (20 msec) |
| Bits per LPC update | 40 | 20 | 10 | 10 |
| Pitch updates (subframes) per frame | 4 | 2 | 1 | 0 |
| Samples per pitch subframe | 40 (5 msec) | 80 (10 msec) | 160 (20 msec) | — |
| Codebook updates (subframes) per frame | 8 | 4 | 2 | 1 |
| Samples per codebook subframe | 20 (2.5 msec) | 40 (5 msec) | 80 (10 msec) | 160 (20 msec) |
| Bits per codebook update | 10 | 10 | 10 | 6 pseudo random |

Table I describes the various parameters used for each rate. The number in the bits per LPC update block of Table I is the number of bits used at that particular rate to encode the LPC coefficients. Each pitch block corresponds to a pitch update within each frame, and the number in each pitch block corresponds to the number of bits used to encode the updated pitch parameters. For example, at rate 1, the pitch parameters are updated 4 times, once for each quarter of the speech frame, each time using 10 bits to encode the new pitch parameters. This is done a varying number of times for the other rates as shown. Each codebook updates block corresponds to a codebook update within each frame and the number in each codebook block corresponds to the number of bits used to encode the updated codebook parameters. For example, at rate 1, the codebook parameters are updated 8 times, once for each eighth of the speech frame, each time using 10 bits to encode the parameters. The number of updates decreases as the rate decreases.

We claim:

1. A subscriber unit for a digital radiotelephone system having a fixed station with at least one radio transceiver and a first vocoder to convert a first analog signal to a digital signal at a first predetermined data rate to provide service to a plurality of subscriber units within a radio coverage area of the fixed station, each of the plurality of subscriber units employing a second vocoder to convert a second analog signal to a digital signal at the first predetermined data rate, the subscriber unit comprising:

- a battery state of charge detector, whereby a battery state characteristic of the subscriber unit is monitored and a signal generated when a predetermined threshold is crossed; and
- a resource controller which receives said signal from said battery state of charge detector and which generates an instruction to at least one of the first and second vocoders to change from the first predetermined data rate to a second predetermined data rate.

2. A digital radiotelephone system including a fixed station having a radio transceiver and a first vocoder to convert a first analog signal to a digital signal at a first predetermined data rate, for transmitting to and receiving from a radio coverage area to provide service to a plurality of subscriber units within the radio coverage area, each subscriber unit employing a second vocoder to convert a second analog signal to a digital signal at the first predetermined data rate, comprising:

- a first group of subscriber units predeterminedly assigned a priority level;
- a system occupancy detector, coupled to the radio transceiver, which provides an output signal related to a number of the plurality of subscriber units actively receiving service from the digital radiotelephone system in the radio coverage area;
- a subscriber priority list and list scanner which selects said first group of subscriber units; and
- a threshold detector which monitors said output signal and generates an instruction to at least one of the first and second vocoders of a selected first priority subscriber unit to change from the first predetermined data rate to a second predetermined data rate.

3. A method of adaptation of a subscriber unit employed in a digital radiotelephone system having a fixed station with at least one radio transceiver and a first vocoder to convert a first analog signal to a digital signal at a first predetermined data rate, the fixed station providing service to a plurality of subscriber units within a radio coverage area of the fixed station, each of the plurality of subscriber units employing a second vocoder to convert a second analog signal to a digital signal at the first predetermined data rate, the method comprising the steps of:

- detecting battery state of charge of the subscriber unit, whereby a battery state characteristic is monitored and a signal generated when a predetermined threshold is crossed; and
- generating, in response to said signal, an instruction to at least one of the first and second vocoders to change from the first predetermined data rate to a second predetermined data rate.

* * * * *